(12) United States Patent
Hauger (10) Patent No.: US 7,209,238 B2
(45) Date of Patent: *Apr. 24, 2007

(54) INTERFEROMETER ARRANGEMENT AND INTERFEROMETRIC MEASURING METHOD

(75) Inventor: Christoph Hauger, Aalen (DE)

(73) Assignee: Carl-Zeiss-Stiftung, Oberkochen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/315,287

(22) Filed: Dec. 23, 2005

(65) Prior Publication Data

US 2006/0146336 A1 Jul. 6, 2006

Related U.S. Application Data

(62) Division of application No. 10/303,003, filed on Nov. 25, 2002, now Pat. No. 7,016,046.

(30) Foreign Application Priority Data

Nov. 24, 2001 (DE) ................................ 101 57 842

(51) Int. Cl.
*G01B 9/02* (2006.01)
*G01P 3/36* (2006.01)
*A61B 6/00* (2006.01)

(52) U.S. Cl. ..................... 356/479; 356/28.5; 356/496; 600/476

(58) Field of Classification Search ............... 356/28.5, 356/479, 496, 497; 600/476–480
See application file for complete search history.

(56) References Cited

U.S. PATENT DOCUMENTS

| 5,321,501 | A | | 6/1994 | Swanson et al. | |
|---|---|---|---|---|---|
| 5,501,226 | A | * | 3/1996 | Petersen et al. | ............ 356/28.5 |
| 5,555,086 | A | | 9/1996 | vonBieren et al. | |
| 6,006,128 | A | * | 12/1999 | Izatt et al. | .................. 600/476 |
| 6,396,587 | B1 | * | 5/2002 | Knupfer et al. | ............. 356/479 |
| 7,016,046 | B2 | * | 3/2006 | Hauger | ....................... 356/479 |

FOREIGN PATENT DOCUMENTS

EP 1 065 468 1/2001
FR 2 312 759 12/1976

* cited by examiner

*Primary Examiner*—Gregory J. Toatley, Jr.
*Assistant Examiner*—Patrick Connolly
(74) *Attorney, Agent, or Firm*—Walter Ottesen (57) ABSTRACT

The invention relates to an interferometer arrangement (1000) having at least one measuring beam path for providing light in an object area, at least one reference beam path and at least one unit for superposing light of the measuring beam path with light of the reference beam path and a unit for detecting an interference phenomenon caused by light from the object area and light from the reference beam path. The invention further relates to a method for measuring the velocity of an object with an interferometer arrangement. In the interferometer arrangement, the unit for detecting has a spatial resolution which corresponds to the characteristic spatial period of the interference phenomenon. In evaluating the time change of the interference signal, the movement of stray centers can be measured. Use of such an interferometer arrangement in a surgical microscope allows to visualize areas of a field of surgery which cannot be accessed with light in the visible spectrum.

3 Claims, 6 Drawing Sheets

INTERFEROMETER ARRANGEMENT AND INTERFEROMETRIC MEASURING METHOD

CROSS REFERENCE TO RELATED APPLICATIONS

This is a divisional application of application Ser. No. 10/303,003 filed Nov. 25, 2002, now U.S. Pat. No. 7,016,046 claiming priority from German patent application 101 57 842.3, filed Nov. 24, 2001, and incorporated herein by reference.

FIELD OF THE INVENTION

The invention relates to an interferometer arrangement and to an interferometric measuring method for measuring the velocity of an object. The object is illuminated with a measuring beam. The light which is reflected from the object interferes with light of a reference beam path thereby generating an interference phenomenon pattern. The interference phenomenon pattern is detected with a detector and is transmitted to an evaluation unit.

BACKGROUND OF THE INVENTION

U.S. Pat. No. 6,396,587 is incorporated herein by reference and discloses an interferometer arrangement for recording depth profiles of an object using "white light interferometry".

In white light interferometry, white light, that is light having a relatively short coherence length, is used. The coherence length of an optical signal is the length over which the signal is phase correlated. For a light source having a long coherence length as, for example, a helium-neon laser, the coherence length can be several kilometers, while for a broadband white light source as, for example the sun, the coherence length is only some micrometers. Light sources having such a short coherence length cause interference phenomena in a light beam path, which is split and then again superposed, only if the optical path length of the two light beam paths between splitting and superposition corresponds within a few optical path lengths, that is, if the optical path lengths correspond within the coherence length.

The interferometer arrangement disclosed in U.S. Pat. No. 6,396,587 includes a superluminescence diode for generating light, which can be used for white light interferometry. The light of this superluminescence diode is coupled into a measuring beam path and a reference beam path. The reference beam path includes a mirror as a reflector element. With the measuring beam path, an object is scanned for measuring its depth profile and/or the density of scattering light centers. The light reflected from the object and from the mirror is superposed on a sensor surface which includes a CCD-detector row. From the location of an interference pattern on the CCD-detector row, a difference in the optical path length of the light in the measuring beam path and the reference beam path can be determined. From the measured difference of the optical path lengths, the position of scattering centers for light in the scanned or depth-probed object is determined and graphically represented.

U.S. Pat. No. 5,321,501 is incorporated herein by reference and discloses an interferometer arrangement and a method for determining depth profiles of an object using short coherent light from a superluminescence diode. The short coherent light from the superluminescence diode is coupled into a measuring beam path and a reference beam path. With the light in the measuring beam path, a section of an object is scanned or depth probed. The light in the reference beam path is guided to a movable mirror which allows to adjust the optical path length in the reference beam path. The light of the measuring beam path and of the reference beam path are brought to interference on a photodetector. From the time variation of subsequent interference phenomena on the photodetector and the known position of the mirror in the reference beam path, the position of scattering centers in the measuring branch is determined.

SUMMARY OF THE INVENTION

It is an object of the invention to provide an interferometer arrangement having a very high measuring accuracy. It is a further object of the invention to provide a method for measuring the velocity of an object with an interferometer.

The interferometer arrangement of the invention includes a measuring beam path directed to and reflected from a specimen or object and a reference beam path. The interferometer has means for superposing light of the measuring beam path on light of the reference beam path to generate an interference phenomenon pattern having a characteristic spatial frequency. The interferometer arrangement further includes means for detecting the interference phenomenon pattern. The detecting means has a minimum spatial resolution which corresponds to the characteristic spatial frequency of the interference phenomenon pattern. The interference phenomenon pattern manifests itself in a spatial variation of the intensity of light at the detecting means. In the present invention, the characteristic spatial frequency of the interference phenomenon pattern matches the spatial resolution of the detecting means. This is achieved in that the detecting means can resolve the spatial period of the interference pattern. In this way, a parameter-optimized interferometer is provided which has a relatively low signal to noise ratio and allows measuring distances reliably based on comparatively little data.

According to a feature of the invention, the detecting means includes a CCD-detector row having a detector pixel geometry which is adapted to the characteristic spatial frequency so that the period of the interference phenomenon covers at least two of the detector pixels. With this feature, the number of pixels of the CCD-row can be kept low. This makes possible high read-out rates of the CCD-row and allows for simpler data processing because the amount of data is correspondingly small.

According to another feature of the invention, the means for superposing light of the measuring beam path onto light of the reference beam path include optics for focusing the light of the measuring beam path and the light of the reference beam path onto the detecting means. The optics has an aperture which is adapted to the detecting means so that all the light of the measuring beam path and the reference beam path is detected on the detecting means. Since, in this way, all the light carrying interference phenomenon information can be evaluated on the detector row, a good signal-to-noise ratio can be achieved.

According to another feature of the invention, the optics for focusing the light of the measuring beam path and the reference beam path on the detecting means illuminate an area on the detecting means which measures twice the radius of a spatial Gaussian intensity profile of light focused on the detecting means. This means that the intensity of light from the measuring beam path and the reference beam path interfering on the CCD-row is at least $1/e^2$ of the maximum intensity of the light on the CCD-row. In this way, the CCD-array is illuminated in a way which is adapted to the measuring range of the detector pixels on the CCD-row.

Preferably, the interferometer arrangement includes a first light conductor arranged in the measuring beam path and a second light conductor arranged in the reference beam path. The first light conductor and the second light conductor have end sections where light exits for generating the interference phenomenon pattern. The detecting means include CCD-detector pixels of size $\Delta x$. The end sections are at a distance $2a$ from each other and a distance d from the detecting means. $\Delta x$, $2a$, $d$, and the wavelength of light $\lambda$ used in the interferometer arrangement satisfy the following relationship:

$$\frac{\lambda d}{2a\Delta x} \geq 2.$$

In this way, the sensitivity of the interferometer arrangement is optimized for a given geometry of the pixels on the CCD-row.

According to another feature of the invention, the interferometer arrangement includes a filter unit for filtering the interference phenomenon pattern. This allows for detecting a difference in the optical path lengths between the measuring beam path and the reference beam path even if the reflection properties of the object which is probed are of inferior quality.

Preferably, the filter unit includes a heterodyne filter having a filter frequency which corresponds to the characteristic spatial frequency of the interference phenomenon pattern. In this way, a very narrow bandpass filtering of the interference phenomenon is achieved and interference phenomena can be detected at a low signal-to-noise ratio. Especially, an interferometer arrangement which includes such a filter unit can resolve the position of scattering centers having a very low reflectivity.

In another embodiment of the invention, the interferometer arrangement includes a signal evaluation unit which is coupled to the means for detecting the interference phenomenon to determine a time variation of the interference phenomenon pattern. This allows to measure precisely the movement of scattering centers in the object region exposed to the measuring beam.

According to another feature of the invention, two reference beam paths are provided in the interferometer arrangement. In this way, a difference in the optical path length for light reflected in the area of the object subjected to the measuring beam can be compared to the optical path lengths of the reference beams so that a statistical measuring error can be minimized and an enhanced resolution or accuracy of the interferometer arrangement can be achieved.

Preferably, the two reference beam paths in the interferometer arrangement have different optical path lengths. In adjusting the measuring ranges of the corresponding reference beam paths, the dynamic range of the interferometer arrangement can be increased. Compared to an interferometer having only one reference beam, the measuring range is expanded by the measuring range of the other reference beam path.

According to another feature of the invention, the first reference beam path and the second reference beam path and the measuring beam path are arranged to generate an interference phenomenon which is characterized by two different characteristic spatial frequencies, the ratio of which is neither an integer nor an integer ratio. In this way, a good separation of signals which are superposed on a single CCD-row can be achieved using heterodyne filtering. Here, use is made of the fact that in filter function regimes, which correspond to higher harmonics of one characteristic signal frequency, there is no signal which is related to interference phenomena of a different characteristic basic frequency caused by the other reference beam path.

A surgical microscope, which includes such an interferometer arrangement, can provide three-dimensional sectional views of an object for a surgeon.

In monitoring the time variation of an interference pattern, the detecting means determines the velocity of an object in the measuring beam path. In this way, the flow of a medium in a capillary or a small tube can be measured.

In focusing the light of the probe beam path on the object, the flow in a capillary can be spatially resolved. This allows, for example, to measure the local flow profile of blood in arteries.

If a CCD-detector row is used for detecting the interference pattern and the time variation of the interference pattern is determined by comparing sequential images on the CCD-detector row, the movement of scattering centers in a cross section of the region of the object or specimen exposed to the measuring beam of the interferometer arrangement can be determined with very high accuracy.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
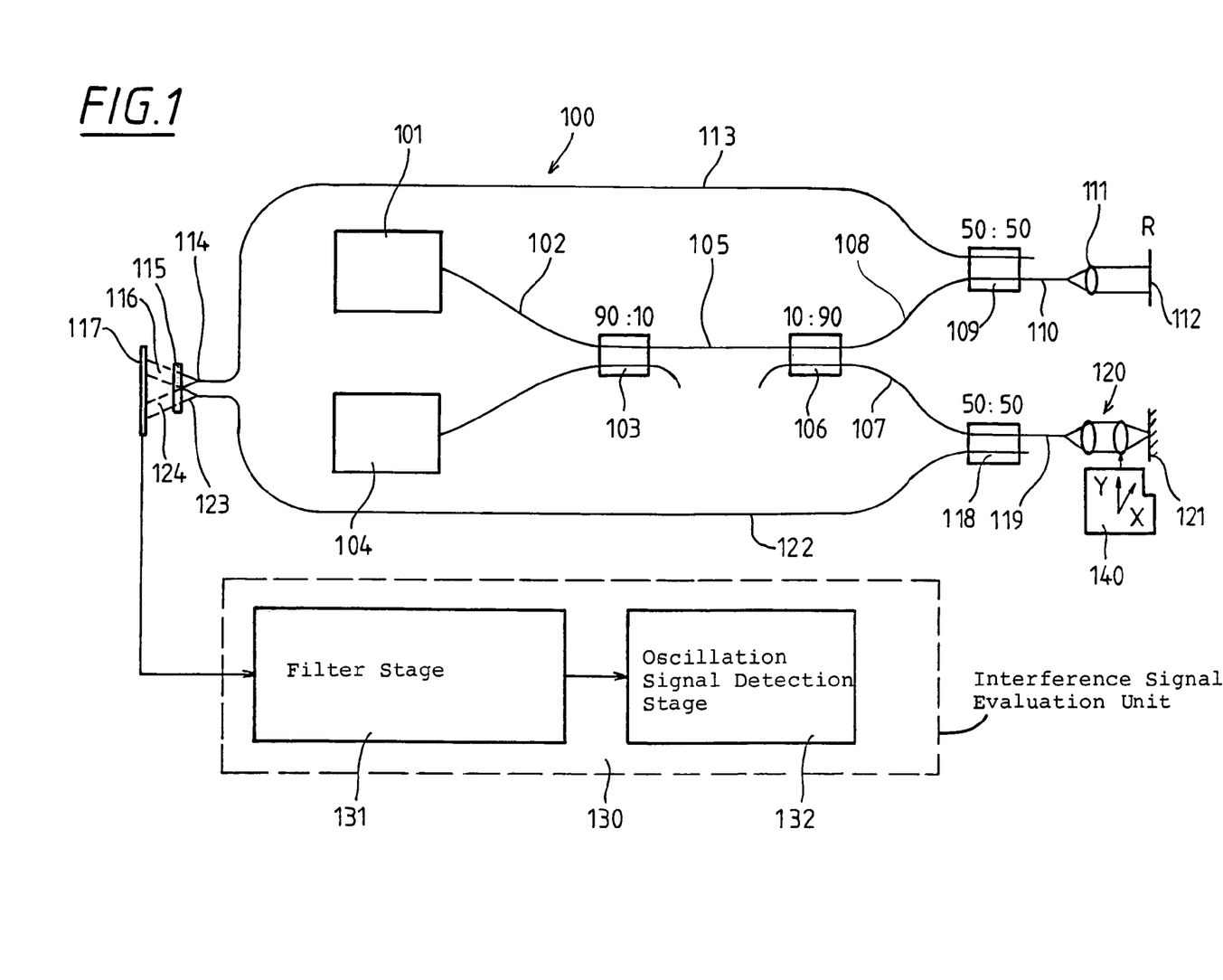
FIG. 1 is a schematic representation of a first embodiment of the interferometer arrangement.

FIG. 1 shows an interferometer arrangement 100 which includes a source of white light 101 in the form of a superluminescence diode. The source of white light 101 emits luminescence light in a wavelength domain of 850 nm with a coherence length of about 10 nm. It is understood, that other sources of white light, which emit light in other spectral domains, could also be used. The source of white light 101 provides light for a measuring beam path and a reference beam path. For this, the light from the source of white light 101 is coupled in a light guide 102, in which a light coupling unit 103 is arranged. In this light coupling unit 103, the light from the source of white light 101 is mixed at a ratio of 90:10 with the light from a laser diode 104, which emits light in the visible spectrum. With the visible light from the laser diode 104, an adjusting beam is provided for the measuring area of the interferometer arrangement 100. The white light, which is mixed with the visible laser light, is guided through a light guide 105 to another light coupling unit 106. This light coupling unit 106 couples light in a measuring beam path which includes a light guide 107 and a reference beam path which includes a light guide 108. The light coupling unit 106 distributes the light from the light guide 105 in the measuring beam path and the reference beam path at a ratio of 90:10. The light coupling unit 106 functions as turnout or switch for light and guides 90% of the light from light guide 105 to the light guide 107 and guides 10% of the light from the light guide 105 to the light guide 108.

In the reference beam path, another light coupling unit 109 is arranged, which provides light for a reference beam area via a light guide 110 and a lens system 111. This reference beam area in the reference beam path includes a mirror 112 which is exposed to the light from light guide 110. The light reflected on the mirror 112 is coupled back into the light guide 110 and guided back to the light coupling unit 109. The light coupling unit 109 diverts 50% of the light provided by the light guide 110 into the light guide 113 which guides it to an arrangement for detecting an interference phenomenon pattern caused by light reflected from an object area and the reference beam area. The arrangement for detecting the interference phenomenon pattern includes as a detector unit a CCD-row 117. The light exiting the light guide 113 at its exit end 114 is guided through a cylindrical lens 115 to generate a ray bundle 116 on this CCD-row 117.

The light, which is coupled into the measuring beam path by the light coupling unit 106, is conducted via a light coupling unit 118 and a light guide 119 and is focused on the object area of an object 121, which is examined, by an optical imaging system 120.

The light reflected from the object 121 is guided back through the optical imaging system 120 and coupled into the light guide 119, which conducts the light to the light coupling unit 118. This light coupling unit 118 couples 50% of the light from light guide 119 into the light guide 122.

In a manner corresponding to the light of light guide 113, the light of light guide 122 exits the light guide at an end 123, passes the cylindrical lens 115 to form a ray bundle 124 reaching the CCD-row 117. With the CCD-row 117, an interference phenomenon pattern is detected, which is caused by the interference of light from the object area with light reflected on the mirror 112 if the conditions for interference are met.

The CCD-row 117 is coupled to an interference signal evaluation unit 130. This interference signal evaluation unit 130 includes a filter stage 131 which is connected to an oscillation signal detection unit 132.

The interferometer arrangement further includes a scan unit 140, which allows for two-dimensional scanning of the object 121 to be examined. From the scanning position of the scan unit and by evaluating the interference phenomena on the CCD-row 117, a distribution of scattering centers in the object area can be visualized as a three-dimensional image.

Figure 2:
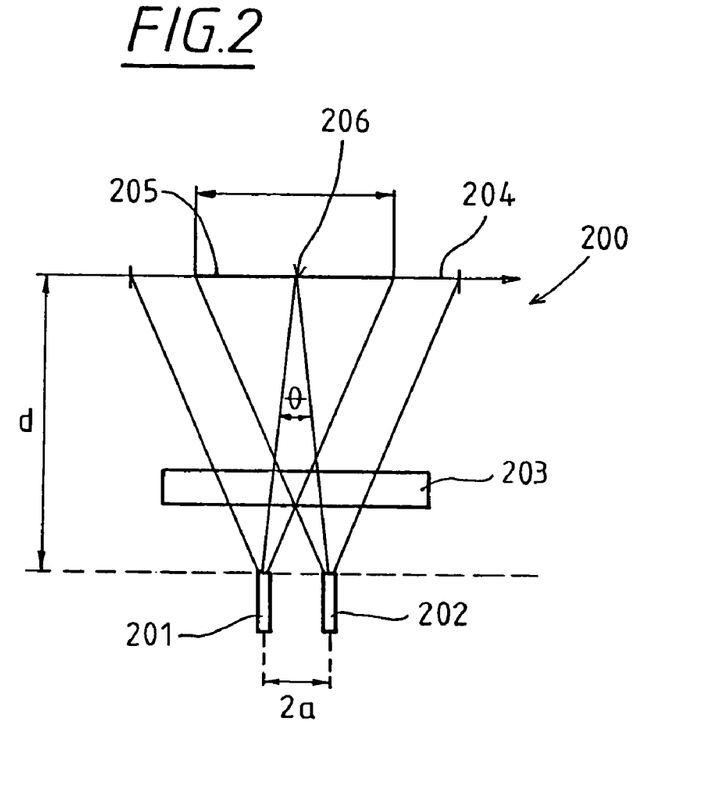
FIG. 2 is a section of the interferometer arrangement shown in FIG. 1.

FIG. 2 shows a section 200 of the interferometer arrangement presented in FIG. 1. Referring to FIG. 1, this section includes the ends of the light guides 114 and 123 as well as the cylindrical lens 115 with the CCD-row 117.

Referring to FIG. 2, the light from the light guides 201 and 202 traverses the cylindrical lens 203 to be focused to a narrow line on the CCD-row 204. This narrow line is detected by the light-sensitive detector pixels of the CCD-row 204. The light exiting the light guides 201 and 202 has a Gaussian intensity profile. This causes a resulting light intensity distribution I on the CCD-row 204 characterized by an envelope which is the superposition of two Gaussian intensity distributions.

Assuming that the reflectance of the object area 121 in the interferometer shown in FIG. 1 and of the reference mirror 112 is the same, the following holds for the intensity distribution I on the CCD-row 117 in dependence on the position 205 with the origin of the coordinate system at the location indicated by reference numeral 206 in FIG. 2:

$$I(x) = 2I_0\left(1 + V_x \cos\left(2\pi \frac{c}{\lambda}(\tau_x + \Delta\tau_z) + \varphi_x\right)\right),$$

wherein:

$\lambda$ is the average wavelength of the light from the source of white light;

c is the velocity of light;

$$\tau_x = \frac{\theta x}{c}$$

is, for different locations x on the CCD-row, the difference in travel time for the light from the two light guides 201 and 202 defining the opening angle $$\theta = \frac{a}{2d};$$

$\Delta\tau_z$ is the difference in travel time for the light of the two light guides 201 and 202 because of the different optical path lengths of the measuring beam path and the reference beam path for the interferometer arrangement shown in FIG. 1;

$V_x$ is the envelope of the interference phenomenon pattern in the form of a Gaussian distribution having a half width $$x_c = \frac{L_c}{\theta}$$

for a coherence length $L_c$ of the light from the source of white light used; and, $\phi_x$ is the phase factor having only a relatively minor dependence on location as compared to the oscillatory component of the interference phenomenon.

Figure 3:
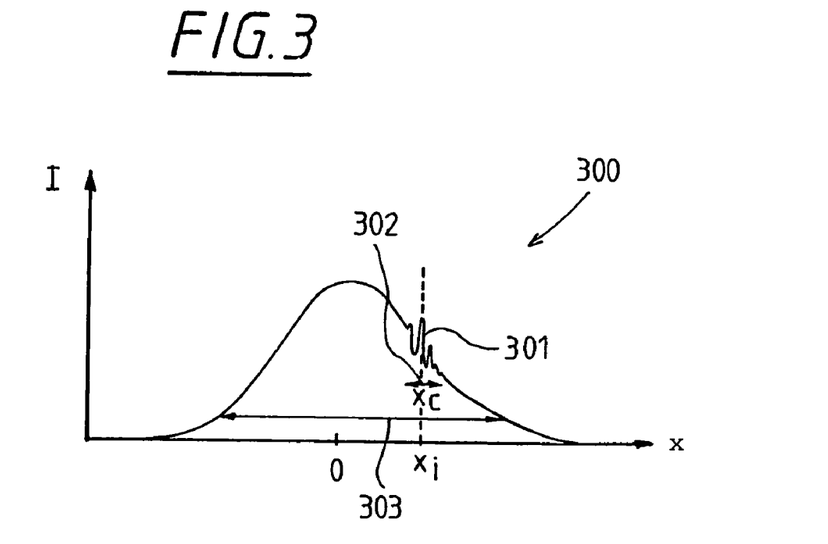
FIG. 3 illustrates an interferometer phenomenon pattern which is detected with the CCD-row of the interferometer arrangement shown in FIG. 1.

FIG. 3 illustrates on an enlarged scale an intensity distribution 300 with an interference phenomenon pattern 301 at location $x_i$ on the CCD-row 117 of FIG. 1. The interference phenomenon pattern 301 has a characteristic frequency:

$$k_c = 2\pi \frac{\theta}{\lambda}$$

and extends at position $x_i$ over a width $$x_c = \frac{L_c}{\theta}.$$

The location $x_i$ of the interference phenomenon pattern 301 on the CCD-row 117 of the interferometer arrangement 100 shown in FIG. 1 thus is determined by the difference in the optical path lengths for the light of the source of white light in the corresponding measuring beam path and the reference beam path. The location $x_i$ corresponds to a well defined difference in the optical path length of the reference beam path and a ray bundle reflected from a scattering center in the measuring beam path. By evaluating the position of the interference phenomenon pattern 301 in FIG. 3 on the CCD-row 117 of the interferometer arrangement 100 of FIG. 1, the exact position of a scattering center in the object area can be measured. Furthermore, from the time variation of the interference phenomenon pattern on the CCD-row, the state of movement of the scattering centers in the object area can be determined. This means that it is possible to measure, in a spatially resolved manner, the velocity of these scattering centers.

In the interferometer arrangement 100 of FIG. 1, the means for detecting the interference phenomenon having the CCD-row 117 and the cylindrical lens 115 is adapted to the characteristic frequency of the interference phenomenon. For this purpose and referring to FIG. 2, the mutual distance $2a$ of the ends of the light guides 201 and 202 as well as the distance d of the ends of the light guides from the CCD-row 204 corresponds to the distance and the size of the detector pixels on the CCD-row so that the spatial variation of a light intensity signal on the CCD-row 117 can be resolved at the characteristic frequency. Hereby, frequency components of this light intensity signal, which are greater than the characteristic frequency, are not resolved. This allows to detect a variation of the light intensity on the CCD-row 204 having a spatial frequency which is less than the characteristic frequency while reading out the CCD-row 204. At the same time, variations of the light intensity on the CCD-row 204, which occur at higher frequencies than the characteristic frequency (for example, because of disturbing effects), are averaged out.

The area 205 on the CCD-row 204 is illuminated both by light from the light guide 201 and by light from the light guide 202 so that the light-sensitive section of the CCD-row 204 is exposed to the light rays from the light guides 201 and 202, which reach the CCD-row 204 within twice the Gaussian radius of the corresponding intensity profile of the light which comes from the light guides 201 and 202. It should be noted that, in principle, it is also possible to illuminate the CCD-row 204 with light from the light guides 201 and 202 at a different intensity profile. For example, the CCD-row 204 could only be illuminated up to once the Gaussian radius. This means that the resulting intensity of the light, which reaches the CCD-row 204, corresponds at least to 1/e of the maximum light intensity on the CCD-row 204.

The measuring range of the interferometer arrangement is determined by the size of the CCD-row section, which is illuminated and on which light from the measuring beam path and the reference beam path can interfere. Assuming that in this section there are N pixels in the CCD-row and that the spatial period $P_c$ of an interference signal having the characteristic frequency $k_c$ covers P pixels, the following holds for the measuring range $\Delta z$ of the interferometer arrangement while using white light of a source of white light having an average wavelength $\lambda$:

$$\Delta z = \frac{N\lambda}{2P}.$$

This means that the position of scattering centers in the object area can only be measured over a depth $\Delta z$.

In the interferometer arrangement 100 shown in FIG. 1, the sizes and the respective spacings of the detector pixels of the CCD-row 117 are so selected that the intensity variations of interference light, which occur at the period of the characteristic frequency $k_c$, cover at least two detector pixels. In this way, a maximum measuring range can be achieved.

To detect a position information of a scattering center in the object area, the CCD-row 117 of FIG. 1 is sequentially read out and the intensity information of each CCD-pixel on the CCD-row is converted into a voltage value. With this sequential serial readout process, a time-dependent electrical voltage signal is generated. By filtering this voltage signal, the disturbances of the interference signal can be removed and the position information carried by the interference signal on the CCD-row can be determined.

For this purpose, the time-dependent voltage signal is filtered in the filter stage 131 of the interference signal evaluation unit 130 of the interferometer arrangement of FIG. 1 with a narrow bandpass filter at a time frequency which corresponds to the characteristic spatial frequency $k_c$. The filter unit 131 is formed by a heterodyne filter having a filter frequency, which corresponds to the characteristic frequency $k_c$. Such a heterodyne filter has a very narrow filter function. As an alternative, other methods of filtering could be used, as for example, LC-filter arrangements or the like.

In the oscillation signal detecting unit 132, which follows the filter unit 131 in the interferometer arrangement 100, the envelope of the filtered voltage signal is determined. The magnitude of this voltage signal at a certain time point is a measure for position and size of a scattering center in the object area.

Furthermore, in the oscillation signal detecting unit 132, the phase position of the filtered voltage signal relative to a reference value is determined. For this, the time points of zero crossovers of the filtered voltage signal are determined. By following the phase position of such an interference phenomenon in sequential read outs of the CCD-row, a conclusion can be drawn as to the movement of a scattering center in the object area of the interferometer arrangement 100 of FIG. 1 by determining the phase position of the filtered voltage signal.

In principle, any object can be investigated with the interferometer arrangement, provided that they at least partially reflect light which is directed onto them. Such objects may be biological material, for example, portions of a human or animal body or plants. It should be noted, however, that the interferometer arrangement may also be used to measure workpieces in an industrial production process, for example, workpieces in a machine tool where dimensions have to be determined very accurately. The interferometer arrangement can also be used to measure the dimensions of optical lenses.

Figure 4:
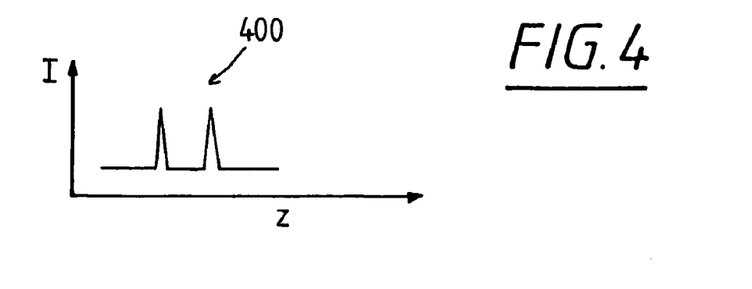
FIG. 4 shows a distance information signal based on two reflecting surfaces measured with the interferometer shown in FIG. 1.

FIG. 4 shows a distance signal 400, which is based on a voltage signal generated by reading out the CCD-row 117 in the interferometer arrangement 100 of FIG. 1. The time-dependent envelope I, which is determined in the oscillation signal detection unit 132 of the interferometer arrangement 100, is plotted with its position information content as a function of the position z, which corresponds to a certain position of scattering centers. This signal comes from an investigated object which has two spatially displaced reflection surfaces.

Figure 5:
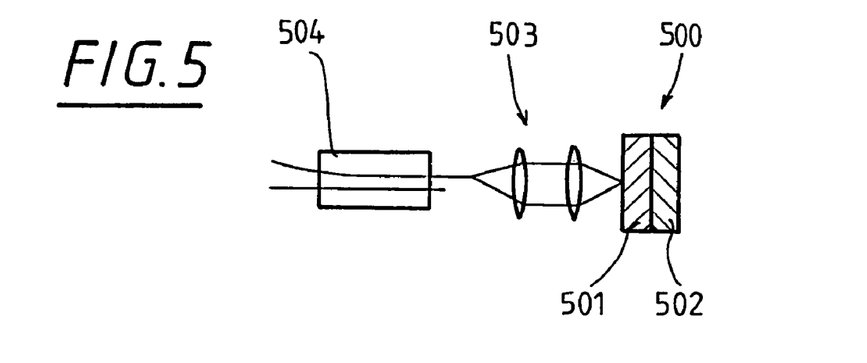
FIG. 5 shows a probe section of the interferometer arrangement of FIG. 1 and a probe having an inhomogeneous distribution of scattering centers.

FIG. 5 shows a section of the interferometer arrangement 100 of FIG. 1 with a sample 500 including a portion 501 having a first homogeneous density of scattering centers and a second portion 502 having another second homogeneous density of scattering centers. This sample is scanned or depth probed with the optical imaging system 503.

Figure 6:
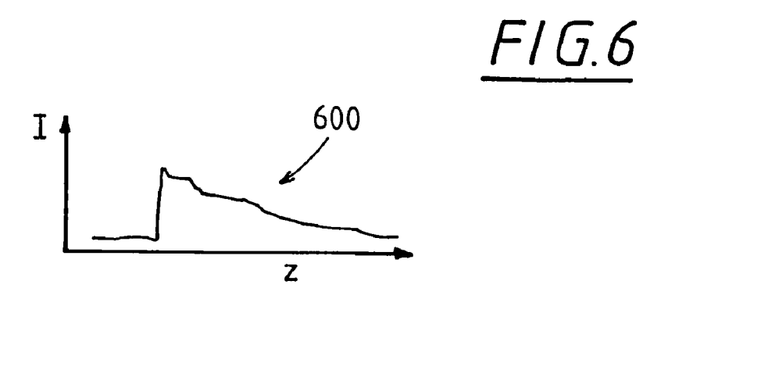
FIG. 6 shows an interferometer arrangement signal illustrating the information gained on the position of scattering centers for the probe shown in FIG. 5.

In the interferometer arrangement, the scattering centers generate an intensity distribution signal which is shown in FIG. 6. This intensity distribution signal can be processed for image generation whereby a density distribution of scattering centers is assigned to the structure of the signal intensity distribution 600 shown in FIG. 6.

Figure 7:
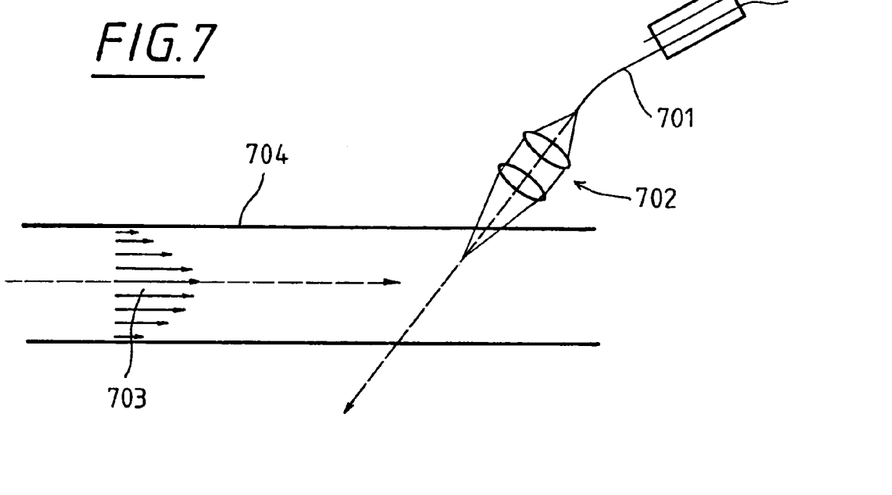
FIG. 7 shows a section of the interferometer arrangement presented in FIG. 1 and a liquid or gas flowing through a capillary.

FIG. 7 illustrates how the velocity profile of a fluid flowing through a capillary can be measured. The interfering light of the light guide 701 is focused on optical scattering centers in the fluid flow 703 in the capillary 704. If the scattering centers pass the focus 705 in the object area of the interferometer, they cause the interference pattern on the CCD-row to travel. This is because the light reflected from the scattering centers in the fluid flow interferes with the light in the reference beam path while the differences in the optical path lengths between the measuring beam path and the reference beam path are continuously changed as the scattering centers move. From the time variation of the phase of the corresponding interference signal on the CCD-row 117, the interference signal evaluation unit 130 determines a movement of the scattering centers. The measurement of the velocity is the more precise the smaller the opening angle of the motion direction of the scattering centers to the direction of the scanning light.

Figure 8:
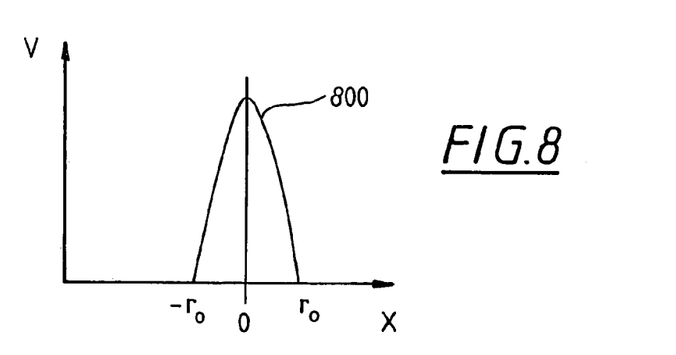
FIG. 8 illustrates the flux profile of a laminar flow in the capillary shown in FIG. 7.

The flow profile 800 of a laminar flow in a capillary having a radius $r_0$ is shown in FIG. 8. The flow profile 800 has a maximum at the center of the flow. At the borders of the capillary however, the flow of the fluid is zero.

Figure 9:
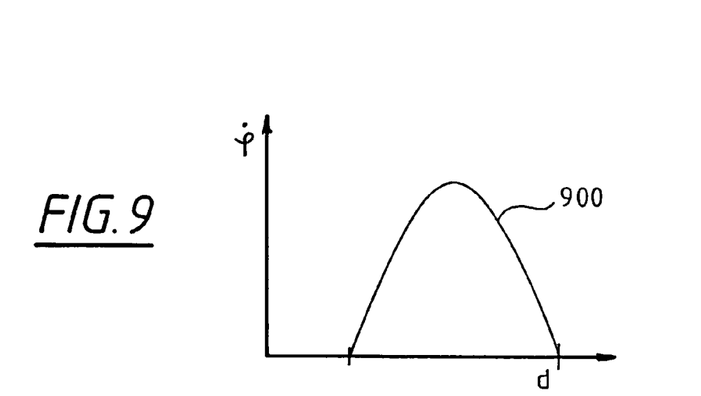
FIG. 9 illustrates the information on the flux profile in form of a time-dependent phase shift as determined with the interferometer arrangement shown in FIG. 1.

FIG. 9 shows the rate of change $\phi$ of the phase of the filtered oscillation signal in dependence on the position d of the scattering centers in the object area when the flow profile of the fluid in the capillary is monitored with the interferometer arrangement 100 shown in FIG. 1 as explained with respect to FIG. 7. The position-dependent rate of change 900 corresponds to a local flow velocity of the scattering centers. This position dependent rate of change mirrors the flow profile of a laminar fluid flow as shown in FIG. 8.

Figure 10:
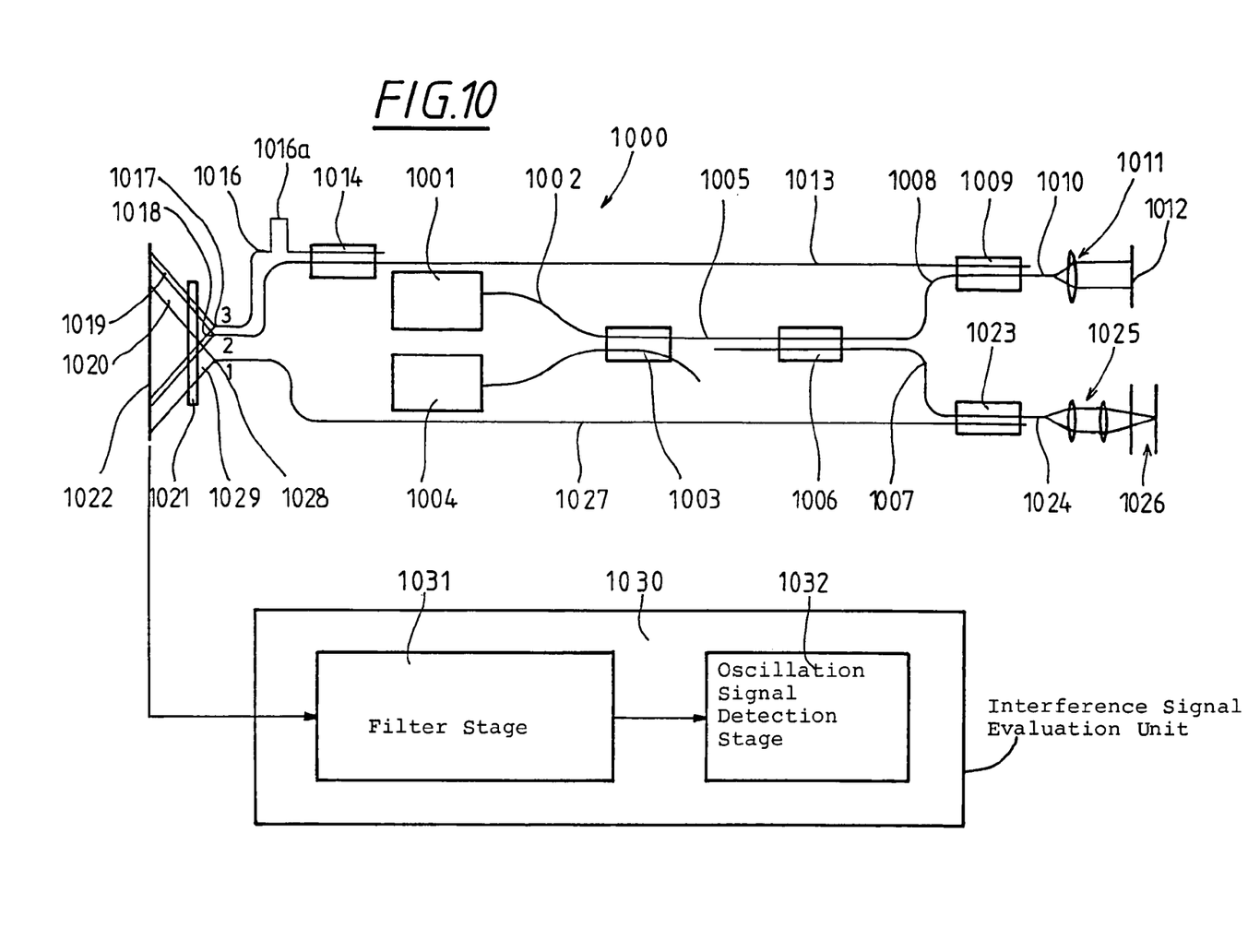
FIG. 10 is a schematic representation of a second embodiment of the interferometer arrangement having a greater dynamic range.

FIG. 10 shows an interferometer arrangement 1000, which has a greater measuring range than the interferometer arrangement 100 shown in FIG. 1. The interferometer arrangement 1000 includes a source of white light 1001 which provides light that is coupled into light guide 1002, as in the interferometer arrangement 100 of FIG. 1. The light of the light guide 1002 is supplied to a light coupling unit 1003, where it is mixed at a ratio of 90:10 with light from a laser diode 1004 providing light in the visible spectrum. With the visible light of the laser diode 1004, an adjusting laser beam is provided for the object area of the interferometer arrangement 1000. The mixed light is supplied via a light guide 1005 to a light coupling unit 1006, where it is divided at a ratio of 90:10 between a measuring beam path which includes a light guide 1007 and a reference beam path having a light guide 1008. The light coupling unit 1009 gives light to a light guide 1010, which guides reference light in a reference beam path for interference. The light from the light guide 1010 is guided to a mirror 1012 via a lens system 1011. The light reflected back from this mirror 1012 is guided back via the light guide 1010 to the light coupling unit 1009. This light coupling unit 1009 couples 50% of the light of light guide 1010 into a light guide 1013. In the light guide 1013, another light coupling unit 1014 is arranged, which divides the light supplied by light guide 1013 at a ratio of 50:50 between a light guide 1015 and a light guide 1016. The light guides 1015 and 1016 have ends 1017 and 1018, respectively, where light ray bundles 1019 and 1020 exit with a Gaussian beam profile. These ray bundles 1019 and 1020 are focused to a narrow line on the CCD-row 1022 by a cylindrical lens 1021.

The light coupled into the measuring beam path by the light guide 1007 is conducted to a light coupling unit 1023 which is connected to a light guide 1024 and an optical imaging system 1025. This optical imaging system 1025 includes two lenses, which are provided for focusing a measuring light ray bundle onto the object area of an object 1026 which is examined. The light reflected from the object 1026 again enters the light guide 1024 and is guided back to the light coupling unit 1023 where it is mixed with the light from the measuring beam path 1007 so that 50% of the light from the light guide 1024 is passed to the light guide 1027. The light guide 1027 has an end 1028 where a ray bundle 1029 having a Gaussian beam profile exits. This ray bundle 1029 is focused on the CCD-row 1022 by the cylindrical lens 1021 to a narrow line.

Analog to the interferometer arrangement 100 of FIG. 1, the interferometer arrangement 1000 includes an interference signal evaluation unit 1030 having a filter stage 1031 and an oscillation signal detection unit 1032.

Figure 11:
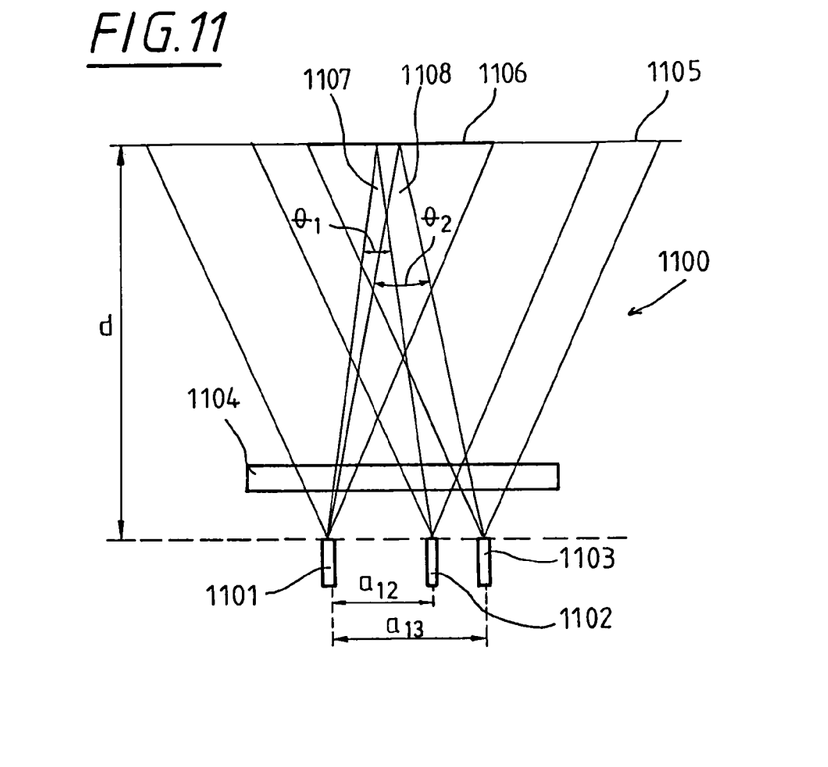
FIG. 11 shows a section of the interferometer arrangement presented in FIG. 10; and, FIG. 12 illustrates an interference phenomenon pattern on the CCD-row of the interferometer arrangement presented in FIG. 10.

FIG. 11 shows a portion 1100 of the interferometer arrangement 1000 of FIG. 10. In FIG. 11, the end sections of the light guides 1017, 1018 and 1028 with the cylindrical lens 1021 and the CCD-row 1022 of FIG. 10 are shown at an enlarged scale.

The light of the light guides 1101, 1102 and 1103 is focused to a narrow line on the CCD-row 1105 by the cylindrical lens 1104. The section 1106 of the CCD-row 1105 is illuminated simultaneously by light from the light guides 1101, 1102 and 1103 so that the minimum intensity of the light of each light guide lies within the intensity region corresponding to twice the Gaussian radius of the intensity profile. As explained with respect to FIG. 2, however, it is also possible to illuminate the CCD-row according to some other criterion for the intensity.

In this way, interference phenomena in the section 1106 can be detected with the CCD-row 1105. Because of the different distance $a_{12}$ of the exit end of the light guide 1101 from the exit end of light guide 1102 and the distance $a_{13}$ of the exit end of light guide 1101 from the exit end of light guide 1103, interference phenomenon patterns occur because of the superpositions of light from light guide 1101 upon light from light guide 1102 and the patterns have the characteristic frequencies $$k_{c1} = 2\pi \frac{a_{12}}{\lambda 2d}$$

and $$k_{c2} = 2\pi \frac{a_{13}}{\lambda 2d},$$

wherein:

d is the distance of the exit ends of the light guides 1101, 1102 and 1103 from the CCD-row; and, $\lambda$ is the wavelength of the source of white light 1001.

The two different characteristic frequencies $k_{c1}$ and $k_{c2}$ of the interference phenomena caused by light from the corresponding light guides permit these phenomena to be separated from each other and to assign each interference phenomenon a corresponding difference of the optical path length of the measuring beam path and the reference beam path.

Figure 12:
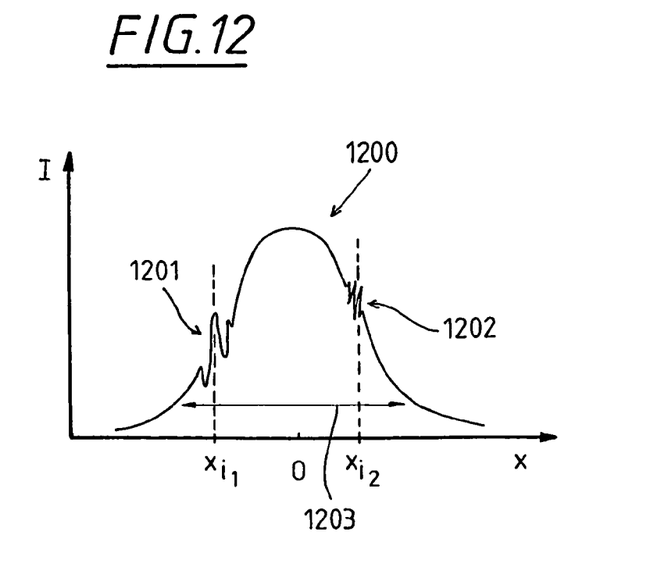

FIG. 12 illustrates, on an enlarged scale, the light intensity distribution 1200 for two scattering centers at different positions in the object area 1026 which results on the CCD-row of an interferometer arrangement 1000 as shown in FIG. 10. The light intensity distribution 1200 includes an interference phenomenon pattern 1201 at location $x_{t1}$ having a characteristic frequency $k_{c1}$ and an interference phenomenon pattern 1202 at location $x_{t2}$ having a characteristic frequency $k_{c2}$.

The spatial resolution of the means for detecting the interference phenomena pattern is adapted to these characteristic frequencies $k_{c1}$ and $k_{c2}$ as in the interferometer 1000 of FIG. 10. Therefore, the mutual distances $a_{12}$ and $a_{13}$ of the exits of the light guides 1101, 1102 and 1103 as well as the distance d of the CCD-row from those exits is adapted to the size of the detector pixels on the CCD-row so that the characteristic frequencies $k_{c1}$ and $k_{c2}$ can be resolved and the oscillatory components of light, which exceed those frequencies, are averaged out. This means, disturbing signals, which do not contain any position information as to scattering centers, are not detected. In order to have a wide measuring range, the size and the distance of the detector pixels are selected in a way that the period of the greater characteristic frequency covers at least two detector pixels.

For measuring the position of a scattering center in the object area, the CCD-row 1022 of FIG. 10 is sequentially read out and the intensity information of each CCD-pixel is converted into a voltage value. This serial read-out process generates a time dependent electric voltage signal. By filtering this voltage signal, disturbing signal components can be removed and the position information of the voltage signal can be extracted.

For this, the time dependent electrical voltage signal is filtered in the filter stage 1031 having narrow bandpass filter means referred to time frequencies, which correspond to the characteristic spatial frequencies $k_{c1}$ and $k_{c2}$. The filter stage 1031 includes two parallelly-connected heterodyne filters having different filter frequencies, corresponding to the characteristic frequencies $k_{c1}$ and $k_{c2}$. For this reason, an especially narrow band filtering is effected.

The amplitudes of the filtered voltage signals are determined in the oscillation signal detecting unit 1032 which follows the filter stage 1031 of the interferometer arrangement 1000 of FIG. 10. The magnitudes of these voltage signals at a certain time point are a measure for the position and dimension of a scattering center in the object area.

Furthermore, the phase position of the filtered voltage signals in relation to a reference value is determined in the oscillation signal detecting unit 1032. For this purpose, the time points of the zero crossovers of the filtered voltage signals are monitored. In following the phase shift of an interference phenomenon in sequential read-outs of the CCD-row, a conclusion can be drawn as to the movement of a scattering center in the object area of the interferometer arrangement 1000 of FIG. 10.

For realizing a good separation of signals of the interference phenomena at the characteristic frequencies $k_{c1}$ and $k_{c2}$, the wavelength $\lambda$, the distance d of the ends of the light guides 1101, 1102 and 1103 from the CCD-row 1105 as well as the distances $a_{12}$ and $a_{13}$ of the ends of the light guides 1101, 1102 and 1103 are selected so that the one characteristic frequency is not an integer multiple of the other characteristic frequency.

The interferometer 1000 of FIG. 10 further includes a delay line 1016a which is adapted to the coherence length of the white light used, so that a continuous dynamic range of the interferometer arrangement is provided, which corresponds roughly to twice the dynamic range of an interferometer arrangement having only one reference beam path.

It is noted, that the dynamic range of the interferometer shown in FIG. 10 can be expanded by adding further delay lines, in which light is coupled in.

A surgical microscope, which includes an interferometer arrangement as explained with respect to FIGS. 1 and 10 can make visible areas of a field of surgery with a high optical resolution which cannot be accessed with light in the visible spectrum.

It is understood that the foregoing description is that of the preferred embodiments of the invention and that various changes and modifications may be made thereto without departing from the spirit and scope of the invention as defined in the appended claims.

What is claimed is:

1. A method for measuring the velocity of an object comprising the steps of:

directing light onto said object;

interfering light reflected from said object with light of a reference beam path to generate an interference phenomenon pattern having a characteristic frequency ($k_c$);

detecting said interference phenomenon pattern with a detector to provide an interference signal representing a spatial resolution matching said characteristic spatial frequency ($k_c$) of said interference phenomenon;

supplying said interference signal to an evaluation unit to monitor a time variation of said interference phenomenon pattern in said evaluation unit; and, determining the velocity of said object from said time variation of said interference phenomenon pattern monitored by said evaluation unit.

2. The method of claim 1, further comprising the step of focusing said light on said object.

3. The method of claim 1, wherein a CCD-detector row is used for detecting said interference phenomenon pattern; and, said time variation of said interference pattern is monitored by comparing sequential images on the CCD-detector row.

* * * * *